Feb. 25, 1947.   L. M. BOUCHER   2,416,429
APPARATUS FOR LUBRICATING ENGINE PISTONS AND CYLINDERS
Filed Sept. 2, 1943
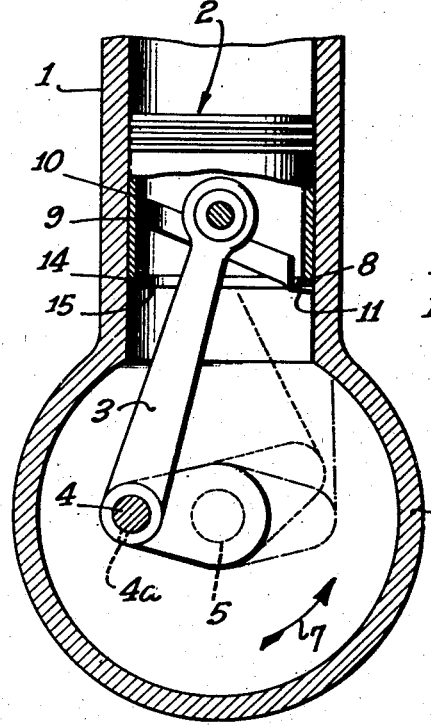
Fig. 1.
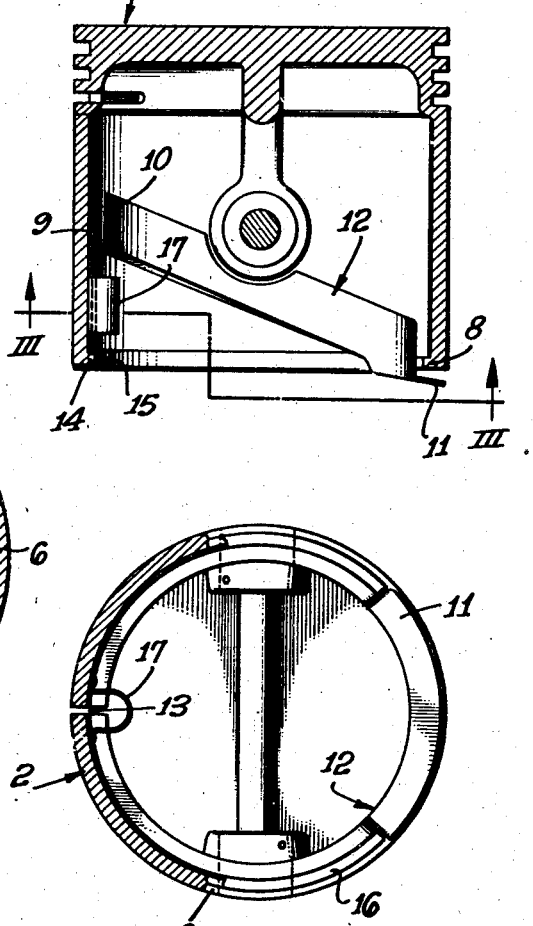
Fig. 2.
Fig. 3.
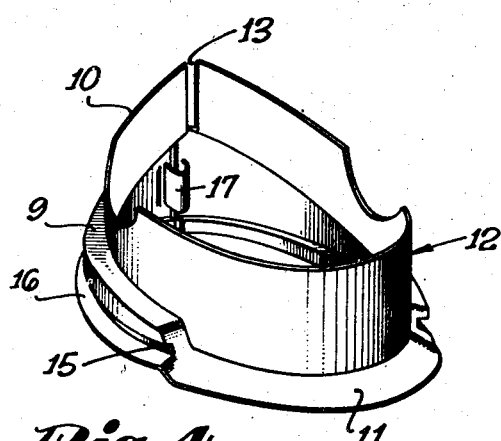
Fig. 4.
LEONARD M. BOUCHER,
INVENTOR.
BY
ATTORNEY.

Patented Feb. 25, 1947

2,416,429

UNITED STATES PATENT OFFICE 2,416,429

APPARATUS FOR LUBRICATING ENGINE PISTONS AND CYLINDERS

Leonard M. Boucher, Santa Monica, Calif.

Application September 2, 1943, Serial No. 500,912

6 Claims. (Cl. 184—18)

My invention relates to apparatus for lubricating pistons and cylinders of engines and has particular reference to apparatus by which adequate lubrication may be applied between the adjacent piston and cylinder walls on that side of the piston which receives the greatest sidewise thrust on the power stroke of the engine.

For many years the application and distribution of lubricant between the cylinder walls and the contiguous piston walls of an engine has been accomplished by depending upon either the dipping of the cranks on the shaft into a pool of oil contained in the crank case and permitting the oil to be lifted therefrom and thrust upwardly into the cylinder as the crank shaft is rotated, or to provide a pressure lubrication system in which oil is forced through the crank arms under pressure and is ejected through a port in the crank arms substantially tangent to the circle of rotation of the cranks so as to inject a stream of oil into the cylinders as the cranks rotate.

In either of these systems the oil is actually applied to the cup-like cavity formed by the piston, most of the oil being thrust into the interior of the piston, and that oil which actually reaches the cylinder walls is such as drains back out of the interior of the piston and along the piston skirt.

The direction in which the oil will be thrown as the crank arms approach their uppermost position in either the exhaust stroke or the power stroke of the engine is such that any oil which is directly applied to the cylinder walls will be upon only one side of the cylinder, the opposite side of the cylinder being shielded against receiving a direct application of oil, first, by the shoulder defined by the junction between the cylinder and the crank case and, second, by the fact that the changing position of the crank shaft throws the oil in a direction away from that side of the cylinder wall. Thus one side of the cylinder walls may be considered as the "wet" side while the opposite side may be considered as the "dry" side.

However, the dry side of the cylinder walls is upon that side which receives the greatest sidewise thrust of the piston during the power stroke of the engine, the resultant of the forces exerted downwardly upon the piston and angularly along the connecting rod being such as to produce this sidewise thrust, with the result that those portions of the cylinder and piston walls which should receive the greatest lubrication actually receive the least.

Many previous attempts have been made to overcome this difficulty, such as providing lubrication ports through the dry side of the piston walls in an effort to cause some of the oil to drain from the interior of the piston to a position between the cylinder and piston walls on the dry side but these attempts have not been particularly successful for the reason that an inadequate supply of lubricant can drain through such openings and the outlet of such openings is disposed at the point at which the cylinder and piston walls are in substantially sealing relation to each other, effectively preventing the oil from entering the space between the cylinder and piston walls.

It is therefore an object of my invention to provide a device which may be applied to pistons to trap oil in the interior of the piston and direct it with considerable force toward the dry side of the piston and eject it upon the cylinder walls immediately below the skirt of the piston.

Another object of my invention is to provide a device of the character set forth in the preceding paragraph, in which such device may be made as an attachment readily applicable to existing pistons.

Other objects and advantages of my invention will be apparent from a study of the following specifications, read in connection with the accompanying drawings, wherein Fig. 1 is a vertical sectional view through a typical engine and illustrating the manner in which I distribute lubricant to the dry side of the cylinder and piston walls;

Fig. 2 is a detail vertical sectional view taken through a typical piston construction and illustrating my lubricant distributing device in place thereon;

Fig. 3 is a horizontal sectional view taken along line III—III of Fig. 2; and

Fig. 4 is a perspective view of my lubricant distributing device constructed as an attachment to be inserted within a piston.

Referring to the drawings, I have illustrated in Fig. 1 a typical internal combustion engine construction in which a cylinder 1 is provided with a piston 2 adapted to reciprocate therein, connected by means of a connecting rod 3 to a crank 4 formed upon a crank shaft 5 rotatable within a crank case 6 which may be formed integrally with the cylinder 1 or as a housing to which the cylinder 1 may be attached.

The crank case 6 is adapted to be partially filled with oil or other suitable lubricant so that if the "splash method" of lubrication is employed, as the crank shaft 5 is rotated in the direction of the arrow 7, the crank arms will dip into the lubricant on the down stroke of the piston and as the crank arms pass through the latter half of their upward movement oil which has been dipped up by the crank arms will be thrown tangentially upwardly into the interior of the cylinder 1. If the pressure method of lubrication is employed the oil under pressure is forced out through a port 4a in the crank 4 adjacent the rod 3 and in a direction substantially tangent to the circle described by the crank pin 4 and during the last half of the upward stroke of the crank pins such oil will be ejected upwardly into the interior of the cylinder 1.

When either of these methods of lubrication is employed, it will be apparent that oil which is either thrown or forced tangentially away from the crank pins and against the left-hand side of the cylinder wall will never reach the right-hand side of the cylinder walls as viewed in Fig. 1, since as illustrated in Fig. 1, prior to the time the tangent becomes parallel with the cylinder walls any oil thrown from the crank pins will strike the upper portions of the crank case 6 and cannot enter the cylinder 1. Then as the tangent passes from a position parallel to the cylinder walls to a substantially right angular position to the cylinder walls, the lubricant is all directed in an angular direction generally toward the left-hand side of the cylinder so that the oil which is directly applied to the cylinder walls reaches only the left-hand side, which may be termed the "wet side" of the cylinder.

As will be readily understood, during the power stroke of the engine, the stroke illustrated in Fig. 1, the resultant forces will thrust the piston against the right-hand side or "dry side" of the cylinder walls, exactly where the lubricant should be but is not.

However, a considerable quantity of oil will be thrown into the inverted cup-like cavity defined by the piston whence it will fall back into the crank case. I provide a means for trapping at least a portion of this oil and for directing the same not only toward the dry side of the cylinder but directly upon the cylinder walls below the skirt 8 of the piston. This means comprises generally a shelf 9 projecting radially inwardly of the piston and preferably provided with an upstanding flange 10 defining a relatively deep trough extending annularly about the interior of the piston. The shape of the shelf 9 is such that it extends diagonally of the piston, descending through a relatively sharp angle from a high point on the "wet side" of the piston to a low point on the "dry side" of the piston, the shelf extending below the skirt 8 in the form of a lip indicated at 11.

Thus a considerable portion of the oil which has been projected into the interior of the piston will be trapped by the shelf and by reason of the steep angle of the shelf the trapped oil will be forcibly ejected over the lip 11 and against the dry side of the cylinder walls immediately below the piston skirt. Thus the dry side of the cylinder walls is assured of an adequate supply of lubricant.

As will be observed from an inspection of Fig. 3, the lip 11 extends about a considerable arc of the piston, preferably approximately one-fourth of the circumference of the piston, so that the lubricant will be applied over a relatively wide area of the dry side of the cylinder.

While the shelf 9 and lip 11 may be formed integrally with the piston, I prefer to provide such shelf structure as a separate device which may be applied to the piston as either a permanent or removable attachment thereto. Such shelf structure may be formed of sheet metal rolled or formed as a ring to be inserted into the interior of the piston and secured therein by screws, rivets or other attaching devices or by welding the same directly to the piston.

If, however, it is desired that the shelf structure be made removable, it may be formed as illustrated particularly in Fig. 4 as comprising a ring 12 split vertically as indicated at 13, the ring being formed to provide the shelf 9, upstanding flange 10 and the projecting lip 11. Since most pistons are provided with an inwardly extending annular flange 14 at the lower end of the piston skirt, the ring 12 may be so formed as to provide an annularly extending groove 15 adapted to receive this flange while below the groove 15 the metal of the ring 12 may be flanged radially to provide a flange 16 adapted to extend below the lower edge of the piston skirt.

Thus the ring may be collapsed by compressing the split ring sufficiently to permit its insertion into the piston and then the ring may be permitted to expand until the piston skirt flange 14 is engaged within the groove 15. Thus the resilience of the material of which the ring is made may be employed to hold the ring in place or if desired a spring 17 may be attached to the ring across the split 13 in such manner as to urge the ring to its expanded piston engaging position.

Regardless of the manner of forming the shelf 9, the shelf should extend upwardly within the piston to a sufficient height to provide a sharp angle of descent for the trapped lubricant and the lip 11 should extend toward the cylinder wall to a point at which it just clears the cylinder to thus insure the application of the greatest possible amount of the trapped lubricant to the cylinder walls.

It will be observed from the foregoing that a relatively large quantity of lubricant will be applied to the dry side of the cylinder, the distribution taking place below the skirt of the piston so as to insure that the lubricant will enter the space between the dry side of the piston and the dry side of the cylinder.

While I have shown and described the preferred embodiment of my invention, I do not desire to be limited to any of the details of construction shown and described herein, except as defined in the appended claims.

I claim:

1. In a device for lubricating pistons and cylinders of engines, a ring member forming an annular shelf having at one side of the annulus a lip projecting beyond the circle described by the annulus, and means for securing said shelf within a piston to dispose the self in a diagonal plane therein with the lip projecting immediately below the piston skirt into close relation to the adjacent cylinder wall.

2. In a device for lubricating pistons and cylders of engines, a ring member forming an annular shelf having at one side of the annulus a lip projecting beyond the circle described by the annulus, and means for removably securing said shelf within a piston to dispose the shelf in a diagonal plane therein with the lip projecting immediately below the piston skirt into close relation to the adjacent cylinder wall.

3. In a device for lubricating pistons and cylinders of engines, a ring member forming an annular shelf having at one side of the annulus a lip projecting beyond the circle described by the annulus, means for securing said shelf within a piston to dispose the shelf in a diagonal plane therein with the lip projecting immediately below the piston skirt into close relation to the adjacent cylinder wall, and an upstanding annular flange on the inner edge of the shelf to form with the shelf and the interior wall of the piston a trough for trapping and directing lubricant toward said lip.

4. In a device for lubricating pistons and cylinders of engines, a split ring member forming an annular shelf having at one side of the annulus a lip projecting beyond the circle described by the annulus, means for securing said shelf within a piston to dispose the shelf in a diagonal plane therein with the lip projecting immediately below the piston skirt into close relation to the adjacent cylinder wall, and a spring member engaging said ring on opposite sides to the split thereof to expand said ring into close relation to the interior wall of the piston.

5. In a device for lubricating pistons and cylinders of engines, an oil trapping member disposed within the piston and defining an oil trapping shelf extending diagonally downwardly toward the skirt of the piston, and a lip on said member at the lower side of said shelf projecting below said skirt and in close relation to the adjacent cylinder wall to direct oil trapped by said shelf to the cylinder wall immediately below the piston skirt.

6. In a device for lubricating pistons and cylinders of engines, an attachment comprising: an oil trapping member to be disposed within a piston adjacent the lower portion of the skirt of the piston to define an oil trapping shelf to extend diagonally downwardly toward the skirt of the piston, said member having a lip extending from the lower side of said shelf for disposition under the edge of the piston skirt and to project beneath said piston skirt, said lip having a length to dispose its outer edge substantially flush with the exterior wall of a piston with which it is associated.

LEONARD M. BOUCHER.

REFERENCES CITED

The following references are of record in the file of this patent:

UNITED STATES PATENTS

| Number | Name | Date |
|---|---|---|
| 1,395,794 | Bruegger | Nov. 1, 1921 |
| 1,492,917 | Bruegger | May 6, 1924 |
| 1,270,606 | Ducorron | June 25, 1918 |
| 1,859,549 | Boucher | May 24, 1932 |

FOREIGN PATENTS

| Number | Country | Date |
|---|---|---|
| 23,339 | British | Oct. 12, 1912 |